United States Patent
Caraballo

[19]

[11] Patent Number: 6,047,520

[45] Date of Patent: Apr. 11, 2000

[54] FLOOR TILE HOLDER, SETTER, AND SPACER; AND TABLE

[76] Inventor: Abelardo Caraballo, 3381 SW. 130 Ave., Miami, Fla. 33175

[21] Appl. No.: 09/126,148

[22] Filed: Jul. 30, 1998

Related U.S. Application Data

[60] Provisional application No. 60/054,304, Jul. 31, 1997.

[51] Int. Cl.$^7$ ............................................. E04D 15/02
[52] U.S. Cl. .................... 52/749.11; 52/127.1; 52/127.2; 52/127.5; 404/73; 404/74; 269/904; 294/103.1; 294/19.1; 294/16
[58] Field of Search ........................ 52/127.1, 127.2, 52/127.5, 749.11; 404/73, 74; 254/11, 131; 269/904, 909, 254 R, 54.3, 54.5; 294/103.1, 19.1, 16, 34, 62

[56] References Cited

U.S. PATENT DOCUMENTS

| | | | |
|---|---|---|---|
| 195,186 | 9/1877 | Tyner | 294/103.1 |
| 651,437 | 6/1900 | Hebert | 294/103.1 X |
| 682,021 | 9/1901 | Bennett | 294/19.1 X |
| 872,748 | 12/1907 | Putney | 294/19.1 |
| 1,164,528 | 12/1915 | Knapp | 294/19.1 |
| 1,797,836 | 3/1931 | Paul | 269/254 R X |
| 2,052,756 | 9/1936 | Elliott | 294/103.1 |
| 2,527,922 | 10/1950 | Falkner | 294/62 |
| 2,575,638 | 11/1951 | Price | 294/19.1 X |
| 2,662,792 | 12/1953 | Ruth | 294/103.1 |
| 2,936,192 | 5/1960 | Lince | 294/16 |
| 3,262,595 | 7/1966 | Seip, Jr. et al. | 294/103.1 X |
| 3,328,066 | 6/1967 | Johnston | 294/19.1 |
| 3,678,645 | 7/1972 | Valdes | 52/749.11 |
| 3,885,688 | 5/1975 | Larsen | 254/131 |
| 4,091,945 | 5/1978 | Patterson . | |
| 4,168,130 | 9/1979 | Barth et al. . | |
| 4,261,607 | 4/1981 | Pilcher . | |
| 4,335,913 | 6/1982 | Lick . | |
| 4,583,879 | 4/1986 | Hofman | 404/73 |
| 4,806,057 | 2/1989 | Cay et al. | 294/103.1 X |
| 4,893,451 | 1/1990 | Valente . | |
| 4,893,859 | 1/1990 | Nash | 294/103.1 |
| 4,930,824 | 6/1990 | Matthews et al. | 294/19.1 |
| 5,137,314 | 8/1992 | Gunter | 254/131 |
| 5,154,465 | 10/1992 | Pakosh . | |
| 5,184,934 | 2/1993 | Gallo | 294/103.1 |
| 5,489,184 | 2/1996 | Huggins | 294/103.1 X |

FOREIGN PATENT DOCUMENTS

| | | |
|---|---|---|
| 3129842A1 | 7/1981 | Germany . |
| 90-030233/05 | 1/1990 | Netherlands . |

*Primary Examiner*—Carl D. Friedman
*Assistant Examiner*—Phi Dieu Tran A
*Attorney, Agent, or Firm*—Robert M. Schwartz

[57] ABSTRACT

The Tile Holder, Spacer, and Setter; and Table is an apparatus used for tiling floors. The apparatus holds tiles, spaces them adjacent tiles, and sets them to a consistent depth. The apparatus allows the user to stand erect without putting stress on their knees and back throughout. The invention also includes a table that is to be used along with the apparatus. The table makes adding adhesive to floor tiles easier and cleaner.

3 Claims, 3 Drawing Sheets

FLOOR TILE HOLDER, SETTER, AND SPACER; AND TABLE

CROSS-REFERENCES TO RELATED APPLICATIONS

This application claims the benefit of U.S. Provisional Application Ser. No. 60/054,304, filed Jul. 31, 1997.

BACKGROUND OF THE INVENTION

Field of the Invention

This invention relates to the field of tile laying. Tile laying involves the placement and setting of tiles into a medium such as mortar. Generally, the tiles are systematically set and spaced in relation to each other.

The process of laying tiles has been practiced for many years. The process generally involves the taking of a tile, placing adhesive on its back and then setting the tile onto the surface. In setting the tile, a great amount of labor especially bending-over is involved. For each tile, a worker must place adhesive onto the tile. Then the worker must bend over and place the tile on the surface before the adhesive hardens. This bending over puts significant amounts of stress on a worker's knees.

In addition to the labor, the laying of tiles requires a substantial amount of skill. A properly laid tile is set equidistant from all of the surrounding tiles. In addition, a properly set tile is set at the same depth as surrounding tiles. Furthermore, due to the action of the adhesive, once a tile is initially set it is difficult to move. However, a worker who has practiced laying tile has the ability to apply the same amount of adhesive so that all of the tiles have an equal depth. Also, an experienced worker can lay a tile that is equidistant from the surrounding tiles without difficulty. Finally, if the tiles are not set properly, the aesthetic quality will not reach a commercially-acceptable standard.

Description of the related art including information disclosed under 37 CFR 1.97 and 1.98

The setting tiles involves the use of a trowel. Generally, the adhesive is applied to the back of the tile with a trowel. The trowel may have grooves in it to facilitate the proper thickness of adhesive on each tile. Once, the adhesive is placed onto the tile, the tile is put onto the surface. Each tile is placed so that it is at the same height as all of the surrounding tiles. The tiles are also placed with a gap between each of the surrounding tiles. For aesthetic reasons the size of the gap is the same in between every tile. Later the gap between tiles is filled with grout.

Several inventions have been made that improve the historical method of laying tiles.

U.S. Pat. No. 4,893,451 by Valente discloses an apparatus for laying tiles. The Valente apparatus includes a suction holding means to hold the tiles, a vibrating means to set the tiles, a bubble level to check the level of the tile, a spacer to provide that each tile be evenly spaced from the surround tiles. Unlike the invention claimed here, the Valente apparatus requires that the worker bend over when using the apparatus to lay tiles on the floor.

U.S. Pat. No. 4,091,945 by Patterson discloses a Tile Setting Apparatus. The Patterson apparatus sets a plurality of tiles at one time. The Patterson apparatus holds the tiles by suction. In contrast to the invention claimed here the Patterson apparatus does not contain a means for spacing the tiles. In addition, the Patterson apparatus requires the user to bend over when laying tiles on the floor.

Dutch patent 90-030233/05 by Vhan discloses a Tile-tamping Tool. The Vhan tool is a tile holder with an elongated handle and a suction means at the other end for holding a tile. In contrast to the currently-disclosed invention the Vhan tool contains no means for setting a tile in a level position. In addition, the Vhan tool provides no means to ensure equidistant spacing compared to the surrounding tiles.

SUMMARY OF THE INVENTION

The invention encompasses an apparatus for the laying of tiles comprising a handle, a shaft, and a tile holder.

The first element of the invention is the shaft. The shaft is connected at one end to the handle. The shaft is connected at its opposite end to the tile holder. The shaft is long enough to allow the user to lay tiles without bending the user's back or knees. In this way, the apparatus permits the worker to work efficiently without bending.

The handle contains an operator means to operate the tile holder. Typically, this operator means is a lever. When the lever is squeezed, the tile is released by the holder. When not squeezed, the lever is spring loaded so that the tile is held until the lever is squeezed again.

The third part of the apparatus is the tile holder. The tile holder holds the tiles as they are placed. The tiles are loaded by the following process: 1) inverting the apparatus, 2) stepping on the handle to spread the pins, 3) inserting the tile, 4) applying the adhesive, 5) returning the apparatus to its normal position.

The tile holder holds the tile by compressing it between pins. Pins are located on each side of the tile. In its preferred embodiment, a plurality of pins are used to prevent the tile from twisting. By compressing the lever, the opposing set of pins are spread which permits the insertion and removal of the tile. By using pins that compress, a range of tile sizes can be fitted in the apparatus. The compression is best done by only one of the opposing sides. By having only one of the opposing sides move, the spacing function (described below) is enhanced.

The pins have an additional function. The width of the pin can be used to space the tiles. By placing the pin against an already laid tile, the tile being placed will be exactly the distance of the width of a pin away from the other tile. In addition, this distance can be adjusted by using pins with appropriate widths.

As previously mentioned, a tile holder with only one side of opposing pins is advantageous to the spacing function of the apparatus. The reason is that the non-moving pins can be placed against adjacent tiles. The tile then can be released by opening the opposing pins and the opposing pins will not bump into adjacent tiles.

The pins not only determine the space between the tiles, the pins determine the depth to which the tiles are set. Typically, a tile has rows of adhesive spread on its back. By using rows of adhesive instead of a sheet, a tile can be compressed against the floor and the adhesive has room to spread. In the prior art, the setting of tiles required skill and experience of the user in order to insure that the tiles are level and set to an equal depth. The apparatus makes this process much simpler. The length of the pins set the depth at which the tiles are set. Furthermore, the length of the pin is adjustable so that the tile can be set at varying depths depending on the user's preferences. A pin that is screwed through a threaded aperture would provide a pin whose height is adjustable.

Another advantage of the apparatus' compression holding system is that it allows the placement of rough and textured tiles. The apparatus can place rough and textured tiles because the it holds the edges of the tile, not the top of the tile.

Another advantage of the invention is that the apparatus can be used to hold the tile in a comfortable position when adhesive is applied. After the tile has been inserted into the inverted tile holder, adhesive is applied. Due to the length of the shaft, the tile is at a convenient level to apply adhesive. The holder further secures the tiles against motion during the application of the adhesive.

Another advantage of the apparatus over the prior art is its light weight. By being light weight, the apparatus can be operated with a minimum stress upon the user.

A final advantage is that the invention requires no electricity. In sites of new construction, no electricity often exists. The tile layers in the prior art that depend on electricity would not work. In contrast, this apparatus requires no electricity. Also, the lack of electricity increases safety. Usually tile is applied to areas that get wet. Water combined with electrical devices presents a safety hazard. However, the apparatus described here requires no electricity and therefore poses less of a hazard.

In addition to the apparatus, the invention encompasses a table. The table is to be used in conjunction with the apparatus and the two enhance each other's functions.

The table is a platform elevated on legs. In the platform a slot and a hole are cut. The slot is located in the side of the platform. The slot provides a space in which the inverted apparatus can be set while placing adhesive onto the loaded tile. The hole is cut to hold a gallon bucket of the adhesive. Typically, adhesive buckets have a rim of larger diameter than the rest of the bucket. The hole is cut to be larger than the diameter of the bucket but smaller than the diameter of the rim. The bucket can be set in the hole and held in place by its rim. The hole is located by the slot so that the apparatus when inserted overhangs the bucket. The advantage of such a configuration is that adhesive can be added to the tile and excess can be simply scrapped back into the bucket.

DETAILED DESCRIPTION OF THE PREFERRED EMBODIMENTS

Figure 1:
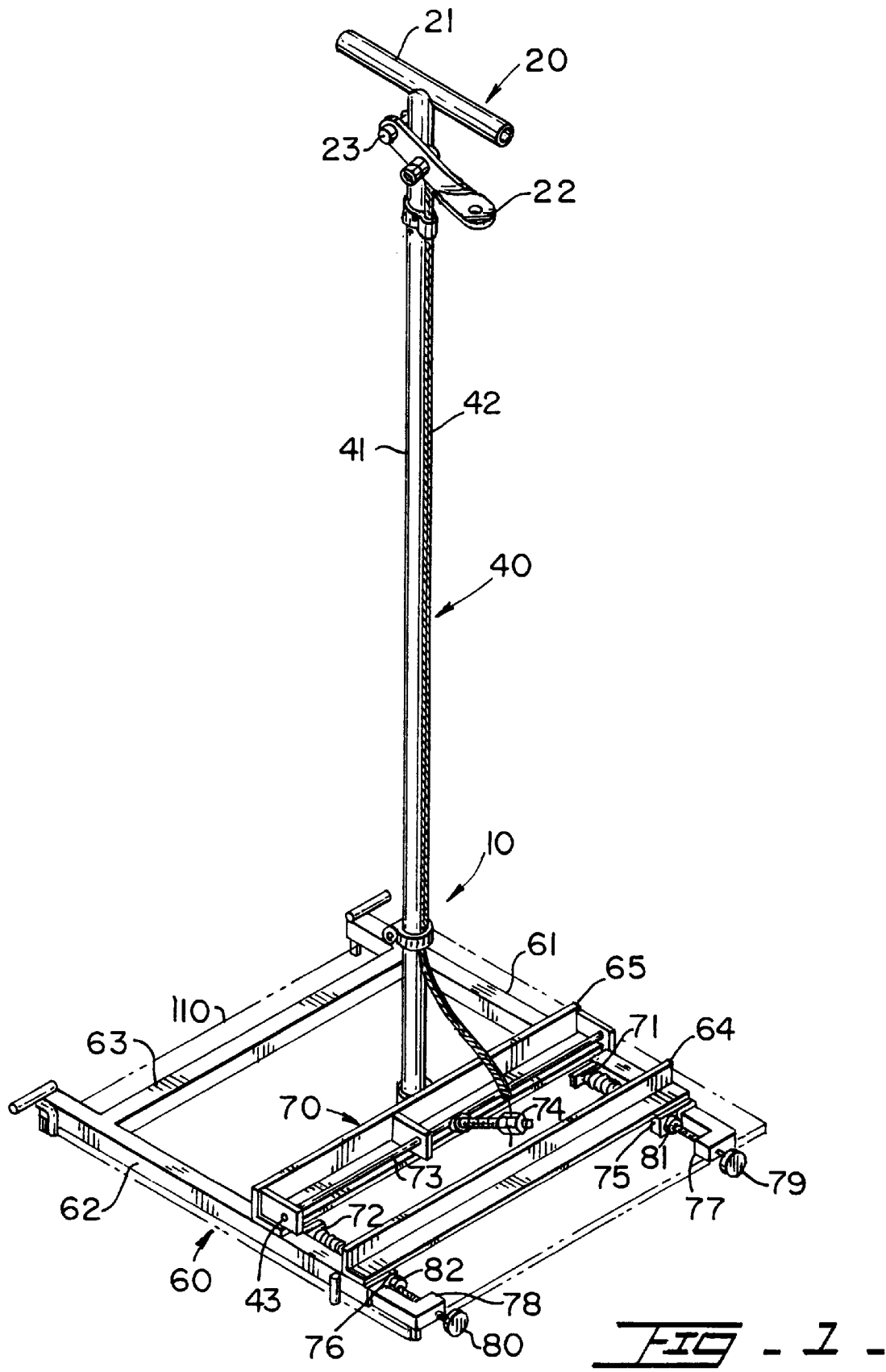
FIG. 1 is a perspective view of the apparatus.
Figure 2:
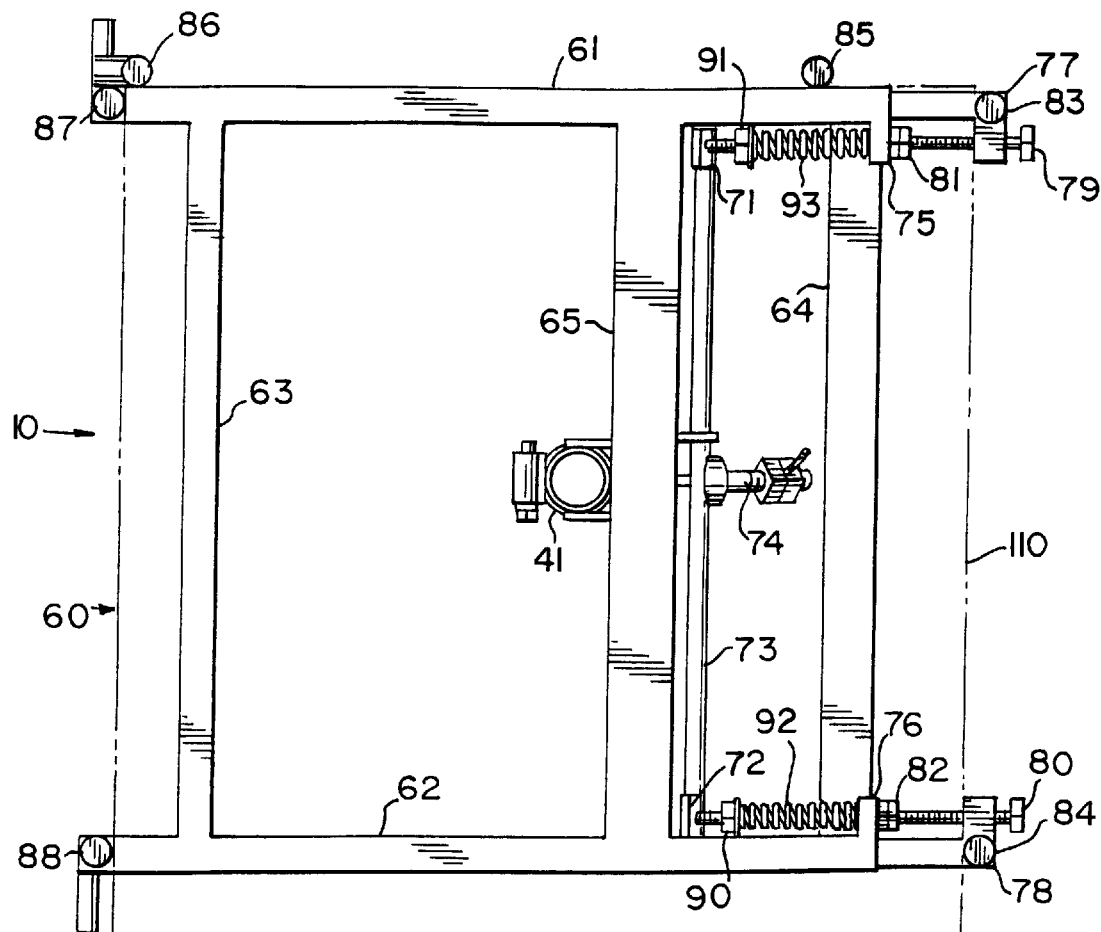
FIG. 2 is a bottom view of the apparatus showing the location of a tile in phantom.

The details of a preferred embodiment of this invention will be better understood in the light of a description thereof that follows, particularly when the reader follows the set of drawings that forms part of this description.

The preferred embodiment of the apparatus is for use with square tiles. The apparatus 10 embodies a handle 20, a shaft 40, and a tile holder 60.

A grip 21 and lever 22 comprise the handle 20. The grip 21 provides a place to hold the apparatus. In addition, the grip 21 provides a firm piece against which leverage can be created when the lever is squeezed. The lever 22 is attached by a first pivot 23 to the stem 41.

Figure 3:
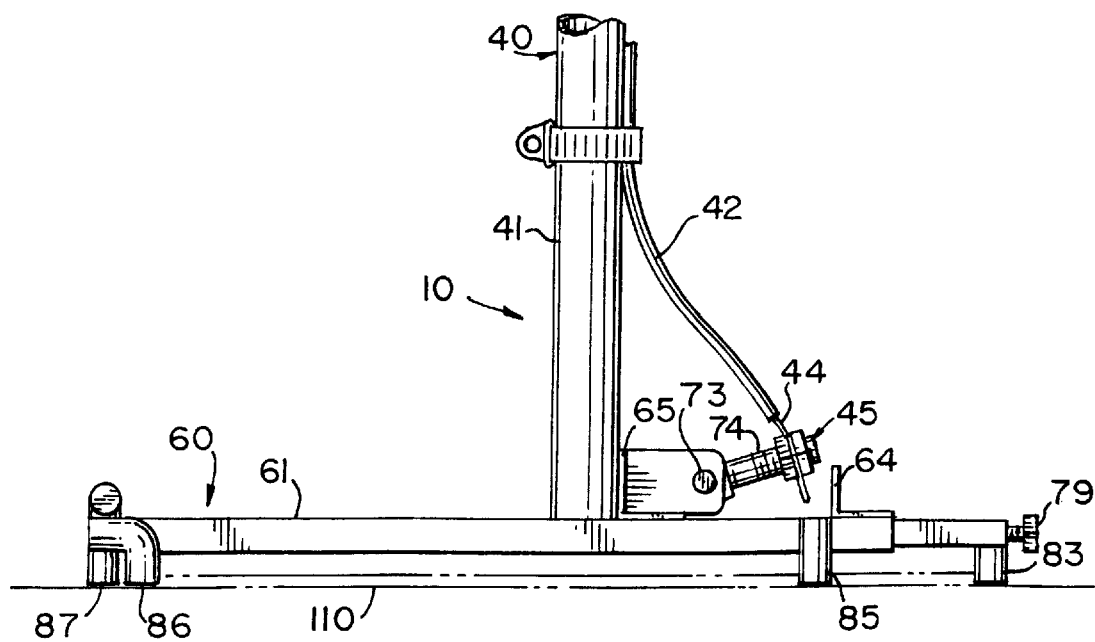
FIG. 3 is a close-up side view of the apparatus.
Figure 4:
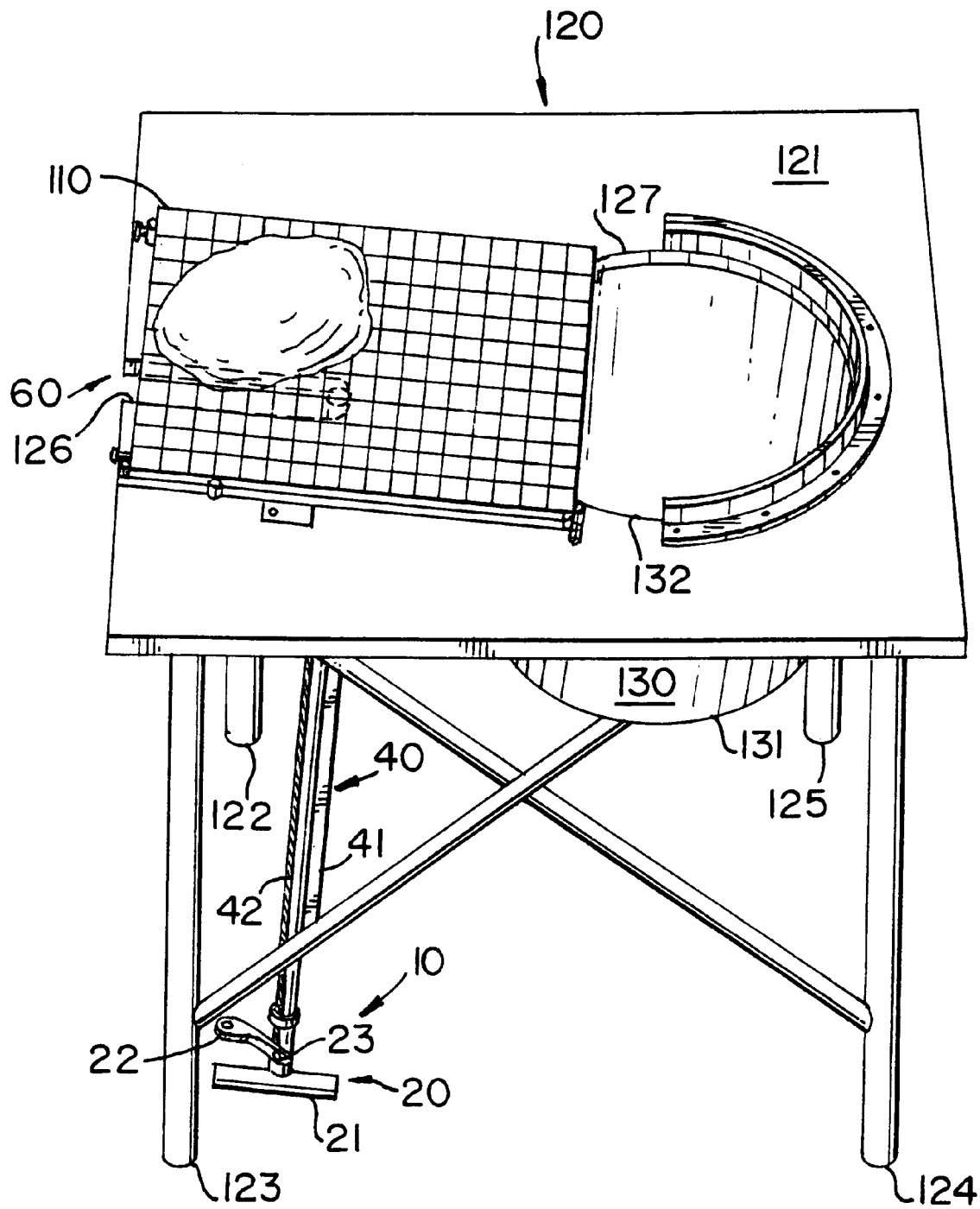
FIG. 4 is a perspective view of the apparatus and table wherein the tile shows the underlying slot drawn in phantom.

The stem 41 and cable 42 comprise the shaft 40. The cable 42 runs front the lever 22 to a cam 45. As shown in FIGS. 1 and 3, when lever 22 is compressed, cable 42 moves. The movement of the wire within the cable rotates the cam 45, The cam 45 rotates on a pivot 43. The second pivot 43 connects the cam 45 to the stem 41. The cam 45 is connected to the wire 44.

The first flap 71, second flap 72, rotator 73, and torque arm 74 comprise the operator 70. The torque arm 74 is connected to wire 44 at cam 45. When the wire 44 moves the torque arm 74 is moved causing rotation of the rotator 73. The rotator 73 when rotated causes the first flap 71 and the second flap 72 to move.

When the flaps 71 and 72 move, the screws 81 and 82 are pushed. The screws 81 and 82 are not connected to the flaps 71 and 72. The screws pass through the eyes (not shown) in the guide members 75 and 76. The screws 81 and 82 are attached to the L-shaped members 77 and 78. The means of attaching the screws to the L-shaped member is by inserting the threaded screws 81 and 82 through the threaded eyes (not shown) in the L-shaped members 77 and 78. By using the threaded attachment means, the point of connection between the screws and the L-shaped members can be adjusted. This adjustment determines the maximum size of tile that the holder 60 can hold. On each bolt 79 and 80, in between the L-shaped members 77 and 78 and the guide members 75 and 76 are nuts 81 and 82. The nuts 81 and 82 can be spun on the bolts 79 and 80 to adjust their location. The location of the bolts 79 and 80 set the minimum in the range of movement.

Tile Holder 60 is a generally rectangular frame. The frame has a first side 61 and second side 62 that are parallel to each other. Third side 63 and fourth side 64 are parallel to each other. First side 61 and second side 62 are perpendicular to third side 63 and fourth side 64. A rod element 65 bisects the frame by connecting to first side 61 and second side 62. Stem 41 is connected at its bottom to the middle of rod element 65. The rectangular frame demarcates a perimeter.

Located on each L-shaped member 77 and 78 is a pin 83 and 84. The pins 83 and 84 attached to the L-shaped members 77 and 78, moves along with the L-shaped member when the lever 22 is actuated. A tile 110 is held between the pins 83, 84, 85, 86 and 88 by compression. A tile is inserted when the pins 83 and 84 are opened by actuating the lever 22. The pins 83 and 84 then close and compress against the tile 110 when the lever is released. The spring tensioners 92 and 93 provide the compressive force. A spring tensioner 92 and 93 is connected to each bolt 79 and 80 held in place via ring connectors 90 and 91. The spring tensioners 92 and 93 pull the L-shaped members 77 and 78 into the opposing side 63 and creates the tension to hold a tile. The first side 61 acts as the frame of the holder 60. The first side 61 is hollow so the L-shaped member 77 can slide in the tube.

The pins 83, 84, 85, 86, 87, and 88 determine the depth and spacing of the tiles. When setting a tile, the pins are placed against an already-placed tile. The new tile is therefore the distance of the width of a pin from the old tile. In addition, because there are pins on each side of the tile, a tile can be evenly spaced from several adjacent tiles.

Another quality of the pins 83, 84, 85, 86, 87 and 88 are that they control the depth to which the tile is set. In laying tiles 110, adhesive is added to the back of tiles 110. The adhesive is applied in lines by using a grooved trowel. The depth of the adhesive should be slightly deeper than that of the pins 83, 84, 85, 86, 87 and 88. The tile 110 is then put in place with the apparatus and pushed down until the pins 83, 84, 85, 86, 87 and 88 contact the ground. The extra adhesive has room to move into the spaces between the rows of adhesive. The result is a tile 110 that has been set to the height of the pins 83, 84, 85, 86, 87 and 88. Furthermore, when a number of tiles 110 are laid with the apparatus, they all have the same depth. In addition, the height can be adjusted by using pins of different length or adjustable pins. An adjustable pin may be a screw that can be driven in or out to set the desired depth.

The method of using the apparatus is comprised by the following: activating the lever 22 so that the pins 83 and 84 are spread, inserting a tile 110 in holder 60, releasing the lever 22 so that the pins 83 and 84 compress and hold the tile, adding adhesive to the bottom of the tile, placing the pins 85, 86, 87 and 88 against adjacent tiles (if adjacent tiles exist), pushing down the apparatus until the pins 83, 84, 85, 86, 87 and 88 contact the floor, activating the lever 22 so that the pins 83 and 84 are spread, and lifting the apparatus while leaving the tile 110 in position.

The invention also encompasses a table 120 to be used in conjunction with the apparatus. The preferred embodiment of the table 120 is comprised by a platform 121 supported by four legs 122, 123, 124 and 125. The platform 121 contains a slot 126 cut in its side. The apparatus 10 is inverted and placed in the slot 126 so that the shaft 40 is in the slot 126 and the holder 60 is resting on the surface of the platform 121. Furthermore, the height of the platform 121 is such that the handle 20 rests on the ground when the apparatus is inserted into the slot 126. Adjacent to the slot, the platform contains a circular hole 127. The diameter of the hole 127 is larger than the diameter of the bottom 131 of a bucket 130 of adhesive but smaller than the diameter of the rim of the bucket 132. This size hole allows a bucket 130 of adhesive to be inserted and held in the hole.

To use the apparatus with the table, the apparatus is inverted and inserted into the slot 126. Next, a tile 110 is inserted into the holder 20. To do this, the lever 22 is stepped on and the pins 83 and 84 are opened. Once the tile 110 is inserted bottom-side-up, the lever is released and the tile becomes held by the holder 60. Adhesive is then taken from the bucket 130 and placed on the tile. Any excess adhesive can be scraped off the tile directly into the bucket 130. After the adhesive is added, the apparatus is inverted and the tile 110 is placed. The advantages of using the table 120 are that the user does not need to bend over when inserting the tile 110 and adding adhesive to the tile 110. Also, the table holds the apparatus so the user has a free hand with which to add adhesive and load tiles 110. Finally, the table 120 helps cleanup because extra adhesive can be scraped directly back into the bucket 130.

I claim:

1. An apparatus for the laying of floor tiles comprising:
   a generally rectangular frame, said frame having a first side, second side, third side, and fourth side, said first side parallel to said second side and said third side parallel to said fourth side,
   a rod element supported within said frame and connected to said first side and said second side,
   a stem having a lower end and an upper end, said lower end affixed about said rod element in a perpendicular fashion, said upper end including a handle having a lever pivotally attached to said stem,
   said lever having a cable affixed thereto, extending substantially the length of said stem,
   a torque arm connecting said cable to a rotating element parallel to said rod element,
   said rotating element being in communication with one or more movable pins,
   one or more non-movable pins located about said perimeter of said frame, whereby, when said lever is pivoted, said cable causes said torque arm to pivot, imparting rotation to said rotating element, which causes said movable pins to bias, thus permitting a tile to be manually placed intermediate said non-moving pins and said movable pins, and when said lever is released, said movable pins are returned to their original position, thus securely holding said tile within said movable and non-movable pins and about said frame.

2. An apparatus for the laying of floor tiles as in claim 1 wherein said non-movable pin elements and said movable pin elements extend an equal length from said frame, permitting said tile to be placed at an exact depth on the floor.

3. An apparatus for the laying of floor tiles as in claim 1 wherein the diameter of at least one of said plurality of non-movable pin elements and said movable pin elements is a desired distance between the currently placed tile and a previously placed tile.

* * * * *